United States Patent
Liang (10) Patent No.: US 12,203,871 B2
(45) Date of Patent: Jan. 21, 2025

(54) INGOT EVALUATION METHOD AND DETECTING APPARATUS

(71) Applicant: GlobalWafers Co., Ltd., Hsinchu (TW)

(72) Inventor: Hsiu Chi Liang, Hsinchu (TW)

(73) Assignee: GlobalWafers Co., Ltd., Hsinchu (TW)

( * ) Notice: Subject to any disclaimer, the term of this patent is extended or adjusted under 35 U.S.C. 154(b) by 241 days.

(21) Appl. No.: 17/976,886

(22) Filed: Oct. 31, 2022

(65) Prior Publication Data

US 2023/0204520 A1 Jun. 29, 2023

(30) Foreign Application Priority Data

Dec. 24, 2021 (TW) ................. 110148663

(51) Int. Cl.
*G01N 21/95* (2006.01)
*G01M 1/12* (2006.01)

(52) U.S. Cl.
CPC ........ *G01N 21/9501* (2013.01); *G01M 1/122* (2013.01)

(58) Field of Classification Search
CPC .............. G01M 1/122; G01M 11/0278; G01N 21/9501; G01N 21/95; G01N 21/01; G01N 21/9505; G01N 2021/0112; G06Q 10/06395; G06Q 50/04
See application file for complete search history.

(56) References Cited

U.S. PATENT DOCUMENTS

| | | | |
|---|---|---|---|
| 7,987,150 B1 | 7/2011 | Luu et al. | |
| 2011/0231129 A1* | 9/2011 | Yanai | H01L 22/20 702/81 |
| 2020/0365685 A1 | 11/2020 | Leonard et al. | |

FOREIGN PATENT DOCUMENTS

| | | |
|---|---|---|
| CN | 106057694 | 11/2018 |
| JP | 4118703 | 7/2008 |
| JP | 7420248 B2 * | 1/2024 |
| KR | 2022110961 A * | 8/2022 |
| TW | 200504352 | 2/2005 |
| TW | 200527572 | 8/2005 |
| TW | 201447279 | 12/2014 |

* cited by examiner

*Primary Examiner* — Peter B Kim
(74) *Attorney, Agent, or Firm* — JCIPRNET (57) ABSTRACT

An ingot evaluation method and a detecting apparatus are provided. Defect information of a wafer is obtained from an ingot. The defect information includes a position of at least one defect identified by optical detection. A center-of-gravity position of the defect is determined according to the defect information. Uniformity of the defect is evaluated according to the center-of-gravity position. The uniformity is related to quality of a processed wafer.

13 Claims, 14 Drawing Sheets

INGOT EVALUATION METHOD AND DETECTING APPARATUS

CROSS-REFERENCE TO RELATED APPLICATION

This application claims the priority benefit of Taiwanese application no. 110148663, filed on Dec. 24, 2021. The entirety of the above-mentioned patent application is hereby incorporated by reference herein and made a part of this specification.

BACKGROUND

Technical Field

The disclosure relates to detection technology. In particular, the disclosure relates to an ingot evaluation method and a detecting apparatus.

Description of Related Art

Silicon carbide (SiC) is a compound semiconductor material composed of silicon and carbon, and is relatively expensive and has special material properties. Quality of a SiC ingot may directly affect a subsequent process. If an ingot with adversely affected quality is processed, the yield and the process quality, and even the cost, may be adversely affected.

SUMMARY

Embodiments of the disclosure provide an ingot evaluation method and a detecting apparatus, which can evaluate quality of an ingot in advance.

According to an embodiment of the disclosure, an ingot evaluation method is adapted for evaluating a wafer. The ingot evaluation method includes (but is not limited to) the following. Defect information of a wafer is obtained from an ingot. The defect information includes a position of at least one defect identified by optical detection. A center-of-gravity position of the at least one defect is determined according to the defect information. Uniformity of the at least one defect is evaluated according to the center-of-gravity position. The uniformity is related to quality of a processed wafer.

According to an embodiment of the disclosure, a detecting apparatus includes (but is not limited to) a memory and a processor. The memory is configured to store a code. The processor is coupled to the memory and is configured to load and execute the code to: obtain defect information of a wafer; determine a center-of-gravity position of at least one defect according to the defect information; and evaluate uniformity of the at least one defect according to the center-of-gravity position. The defect information includes a position of the at least one defect identified by optical detection. The uniformity is related to quality of a processed wafer Based on the foregoing, according to the ingot evaluation method and the detecting apparatus of the embodiments of the disclosure, the uniformity of defect distribution (e.g., whether defects are concentrated or not) is determined by utilizing centers of defects, and is taken as a basis for evaluating quality of an ingot. Accordingly, during a wafer-to-be-tested stage, the quality of the ingot can be judged early, and can be taken as a basis for determining the purchase strategy. In addition, it is possible to save an amount of, for example, processing cost, improve yield and quality during manufacturing, and reduce capacity loss.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
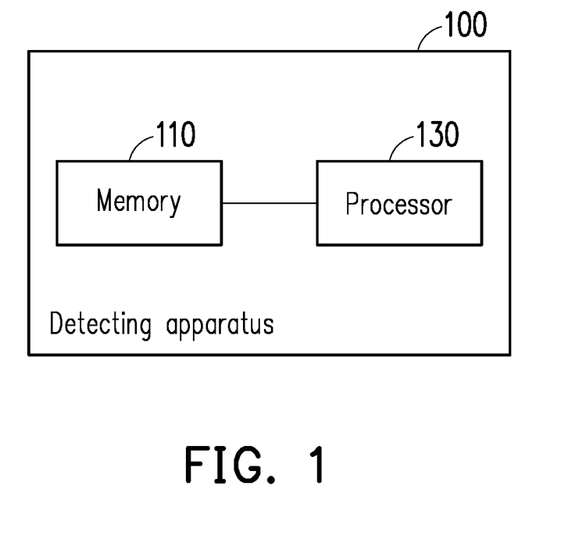
FIG. 1 is a block diagram of elements in a detecting apparatus according to an embodiment of the disclosure.

FIG. 1 is a block diagram of elements in a detecting apparatus 100 according to an embodiment of the disclosure. With reference to FIG. 1, the detecting apparatus 100 includes (but is not limited to) a memory 110 and a processor 130.

The memory 110 may be any type of fixed or removable random access memory (RAM), read only memory (ROM), flash memory, a hard disk drive (HDD), a solid-state drive (SSD), or the like. In an embodiment, the memory 110 is configured to store codes, software modules, configuration, data (e.g., defect information, a center-of-gravity position, uniformity, an evaluation value, or a grade), or files, and will be described in detail in subsequent embodiments.

The processor 130 is coupled to the memory 110. The processor 130 may be a central processing unit (CPU), a graphic processing unit (GPU), or any other programmable general-purpose or special-purpose microprocessor, digital signal processor (DSP), programmable controller, field programmable gate array (FPGA), application-specific integrated circuit (ASIC), or other similar elements or a combination of the above elements. In an embodiment, the functions of the processor 130 may be realized in a stand-alone device, an integrated circuit (IC), or software. In an embodiment, the processor 130 is configured to execute all or some operations of the detecting apparatus 100, and may load and execute the software modules, files, and data stored in the memory 110.

The method according to embodiments of the disclosure accompanied with the elements and modules in the detecting apparatus 100 will be described below. Each process of the method may be adjusted depending on the implementation circumstances, and is not limited by the disclosure.

Figure 2:
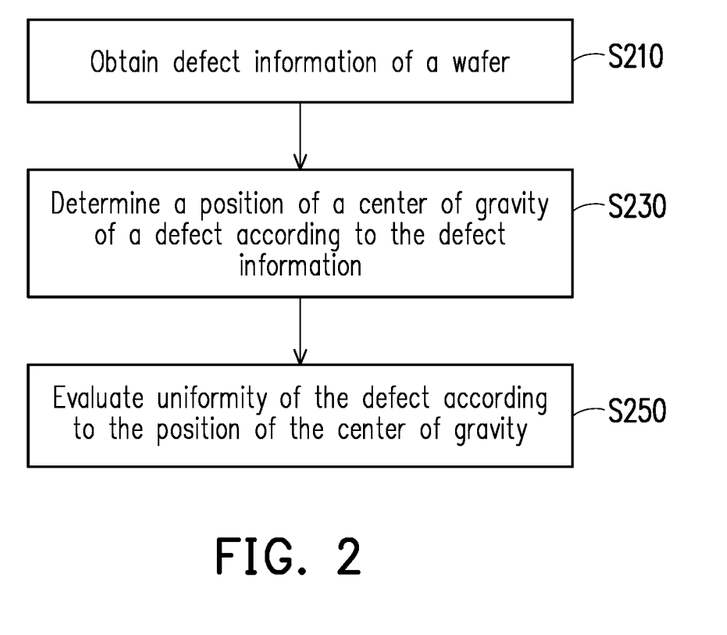
FIG. 2 is a flowchart of an ingot evaluation method according to an embodiment of the disclosure.

FIG. 2 is a flowchart of an ingot evaluation method according to an embodiment of the disclosure. With reference to FIG. 2, the processor 130 obtains defect information of a wafer from an ingot (step S210). Specifically, the ingot may be produced from silicon carbide or other semiconductor materials. The ingot may be cut to produce one or more wafers to be tested. It is worth noting that the wafer may contain multiple crystal defects, for example, basal plan dislocation (BPD), threading edge dislocation (TED), and threading screw dislocation (TSD). An optical detection apparatus (e.g., an automated optical inspection (AOI) apparatus or a wafer detection apparatus) may detect defects on dies in the wafer to generate defect information. In an embodiment, the defect information may include a position of one or more defects identified by optical detection. The position may be coordinates, a relative position, or other position representative values. In another embodiment, the defect information may include a defect type of the detected defect, for example, basal plan dislocation, threading edge dislocation, threading screw dislocation, and so on.

The processor 130 determines a center-of-gravity position of one or more defects according to the defect information (step S230). Specifically, the processor 130 may reconstruct each of the various detected defects on a surface of an imaginary wafer according to the position of the defect, and calculate the overall center of gravity of the position of the defect of each type. For example, assuming that the wafer is complete, the processor 130 may obtain the center-of-gravity position by adding up positions of all defects of a certain type relative to a center of the wafer and dividing the sum by the number thereof (i.e., obtaining an average position). For another example, if the wafer to be tested has a flat edge or a notch, the processor 130 may obtain the center-of-gravity position by averaging positions of defects within a range whose radius is from the center to the flat edge or the notch. It should be noted that the center of the wafer may be a geometric center of the wafer or other specified positions.

The processor 130 evaluates uniformity of the one or more defects according to the center-of-gravity position (step S250). Specifically, with the center of the wafer, the origin of the coordinate system, or other designated centers taken as a reference point, the uniformity increases as a distance between the center-of-gravity position and the reference point decreases; the uniformity decreases as a distance between the center-of-gravity position and the reference point increases. Experiments show that the uniformity is related to quality of a processed wafer. If the uniformity is higher, the quality of the processed wafer may higher. If the uniformity is lower, the quality of the processed wafer may be lower.

Figure 3A:
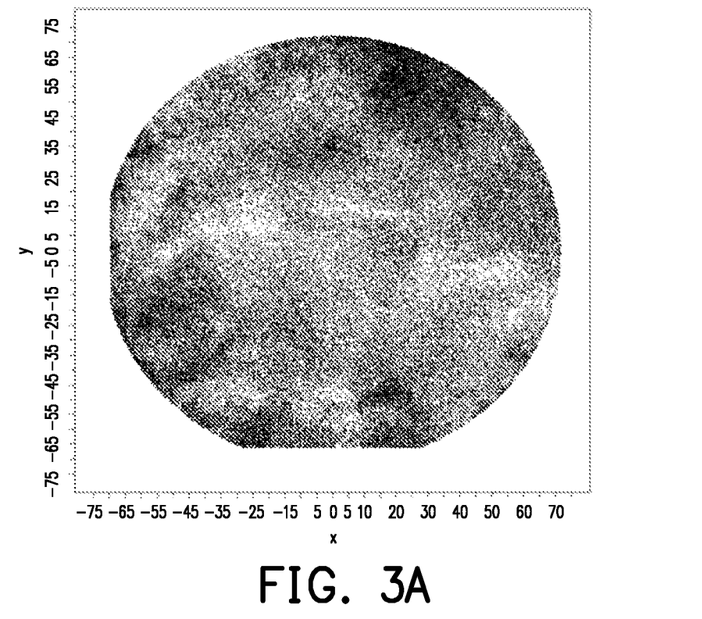
FIG. 3A and FIG. 3B are schematic diagrams exemplarily illustrating defect distribution of wafers to be tested of different qualities for basal plan dislocation (BPD).
Figure 3B:
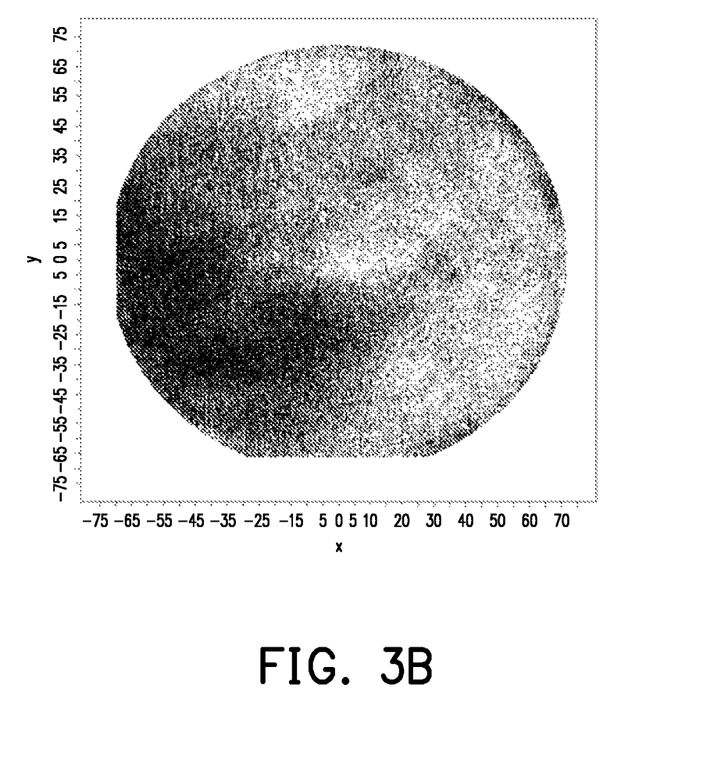

For example, FIG. 3A and FIG. 3B are schematic diagrams exemplarily illustrating defect distribution of wafers to be tested of different qualities for basal plan dislocation (BPD). With reference to FIG. 3A and FIG. 3B, defects are indicated by black dots, the horizontal axis is the X-axis, and the vertical axis is the Y-axis. Some of the defects shown in FIG. 3B are concentrated in the lower left part, and the distribution of the defects shown in FIG. 3A is relatively uniform. Therefore, the processor 130 may evaluate that the quality of the processed ingot of FIG. 3A should be higher than that of the ingot of FIG. 3B. To be specific, indication of the position of the defect may have different designs depending on requirements. The position may be coordinates, a relative position, or other position representative value. FIGS. 3A and 3B serve for exemplary description, but the disclosure is not limited thereto.

Figure 4A:
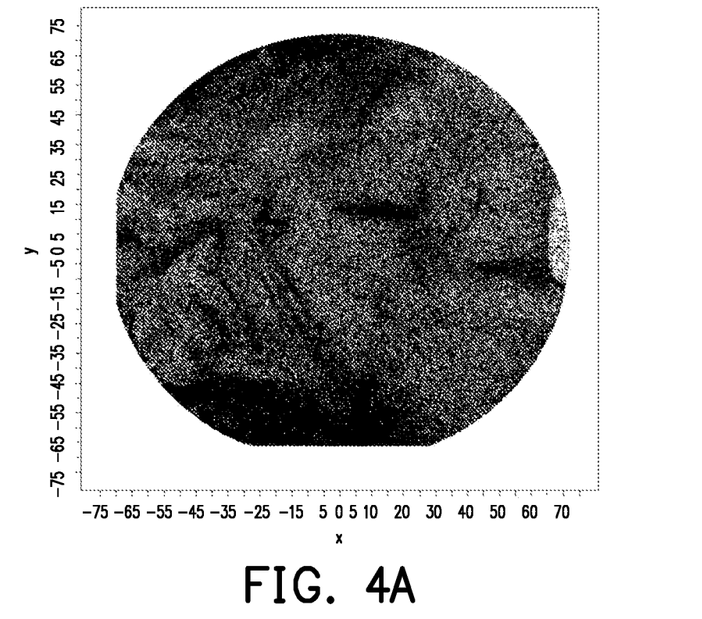
FIG. 4A and FIG. 4B are schematic diagrams exemplarily illustrating defect distribution of wafers to be tested of different qualities for threading edge dislocation (TED).
Figure 4B:
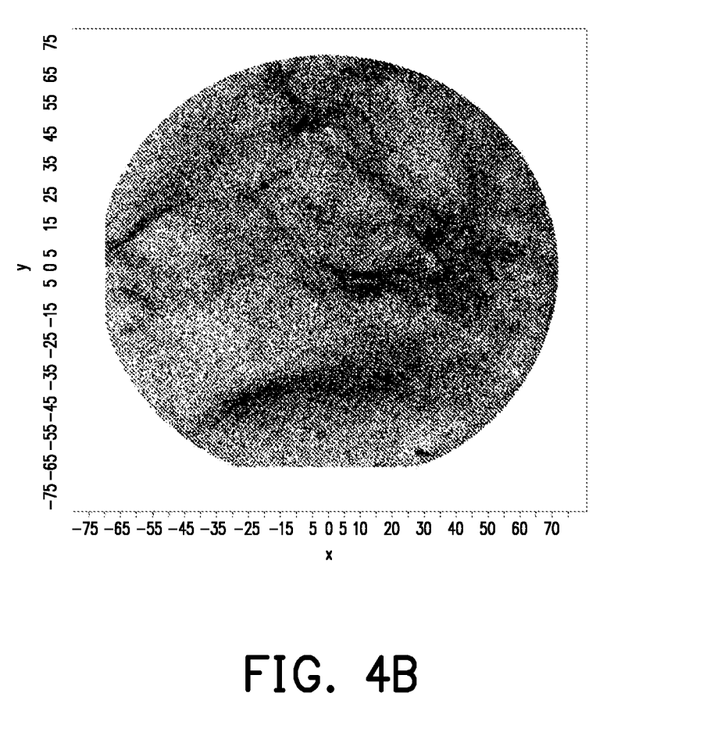

FIG. 4A and FIG. 4B are schematic diagrams exemplarily illustrating defect distribution of wafers to be tested of different qualities for threading edge dislocation (TED). With reference to FIG. 4A and FIG. 4B, defects are indicated by black dots. Some of the defects shown in FIG. 4B are concentrated on the right side, and the distribution of the defects shown in FIG. 4A is relatively uniform. Therefore, the processor 130 may evaluate that the quality of the processed ingot of FIG. 4A should be higher than that of the ingot of FIG. 4B.

Figure 5A:
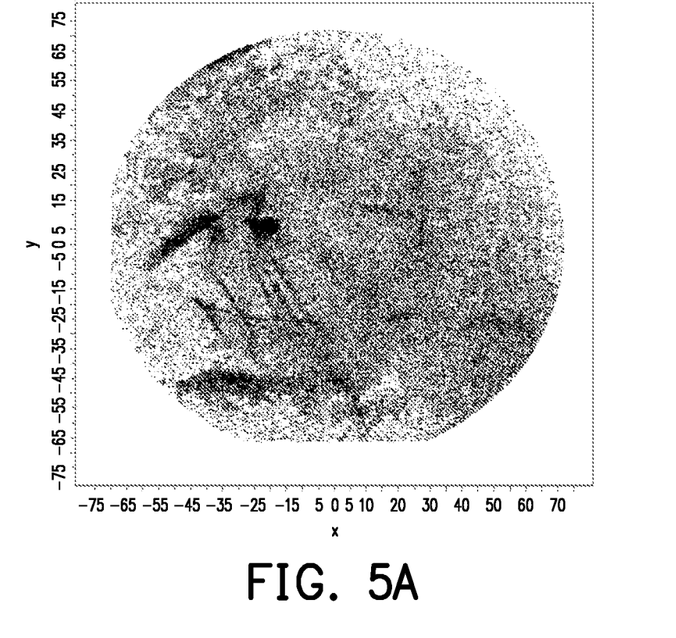
FIG. 5A and FIG. 5B are schematic diagrams exemplarily illustrating defect distribution of wafers to be tested of different qualities for threading screw dislocation (TSD).
Figure 5B:
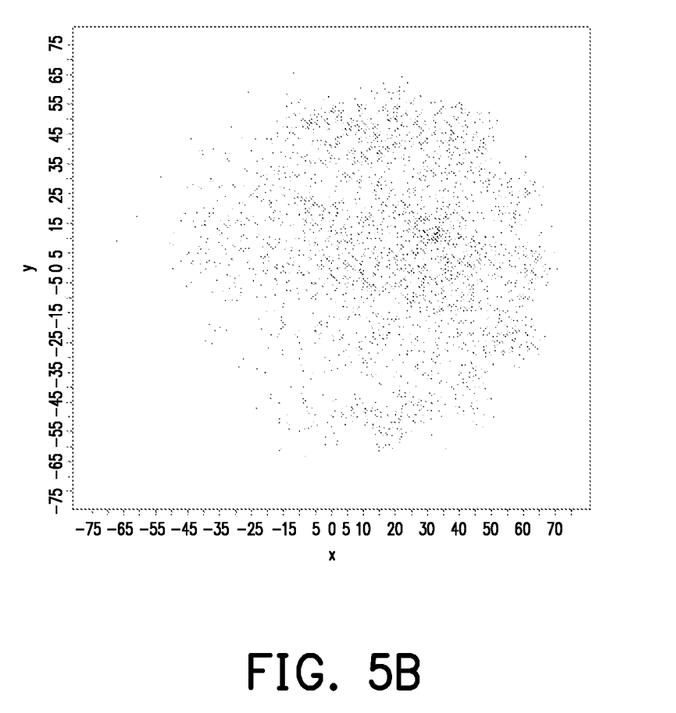

FIG. 5A and FIG. 5B are schematic diagrams exemplarily illustrating defect distribution of wafers to be tested of different qualities for threading screw dislocation (TSD). With reference to FIG. 5A and FIG. 5B, defects are indicated by black dots. Therefore, the processor 130 may evaluate that the quality of the processed ingot of FIG. 5A should be higher than that of the ingot of FIG. 5B.

In an embodiment, an index of the uniformity may be quantified by one or more evaluation values (e.g., 1 to 5 points), grades (e.g., grades A, B, and C), or other quantitative units. The processor 130 may determine a classification range where the center-of-gravity position is located. Each evaluation value/grade corresponds to one classification range, and a center of the classification range is the same as the center of the wafer. The wafer is divided into one or more classification ranges. The processor 130 may determine an evaluation value/grade of the defect of the corresponding type according to the classification range where the center-of-gravity position is located. In other words, if the center-of-gravity position is located within one of the classification ranges, the processor 130 may take the evaluation value/grade corresponding to the classification range where the center-of-gravity position is located as the evaluation result of the uniformity of the defect type.

Figure 6:
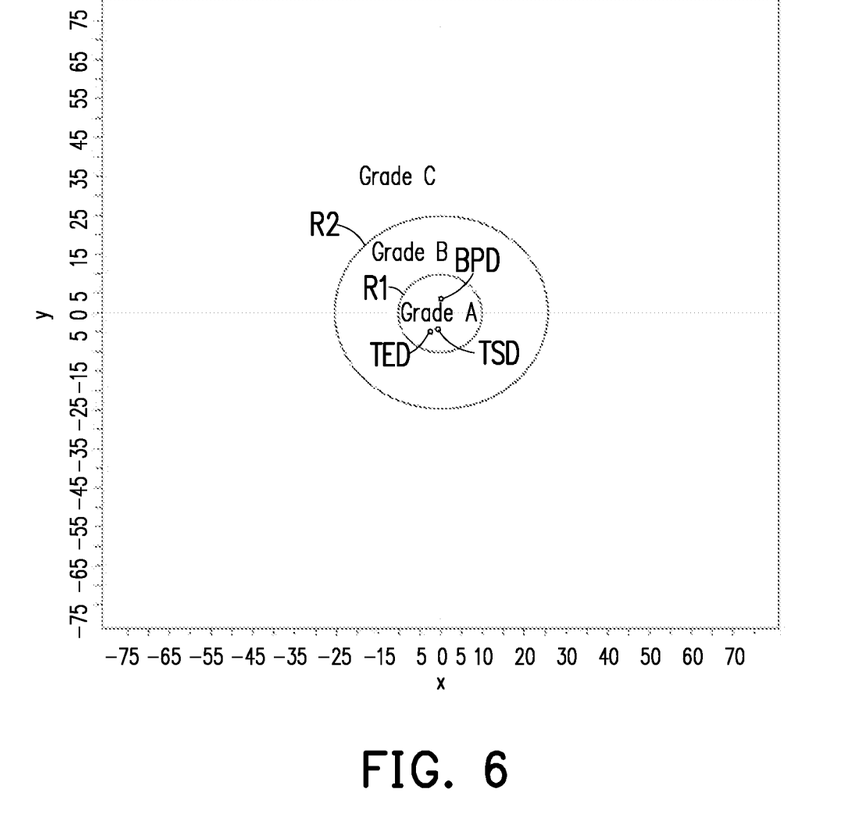
FIG. 6 is a schematic diagram of classification ranges according to an embodiment of the disclosure.

For example, FIG. 6 is a schematic diagram of classification ranges according to an embodiment of the disclosure. With reference to FIG. 6, two concentric circular ranges R1 and R2 are formed on the coordinate system in the diagram. Distances from the center to the boundaries of the two ranges R1 and R2 are different. If the center-of-gravity position is located within the range R1, uniformity of the corresponding defect type belongs to grade A. If the center-of-gravity position is located between the range R1 and the range R2, uniformity of the corresponding defect type belongs to grade B. If the center-of-gravity position is located outside the range R2, uniformity of the corresponding defect type belongs to grade C. Since the center-of-gravity positions of basal plan dislocation BPD, threading edge dislocation TED, and threading screw dislocation TSD are all located within the range R1, the uniformity of these defect types all belong to grade A.

Figure 7:
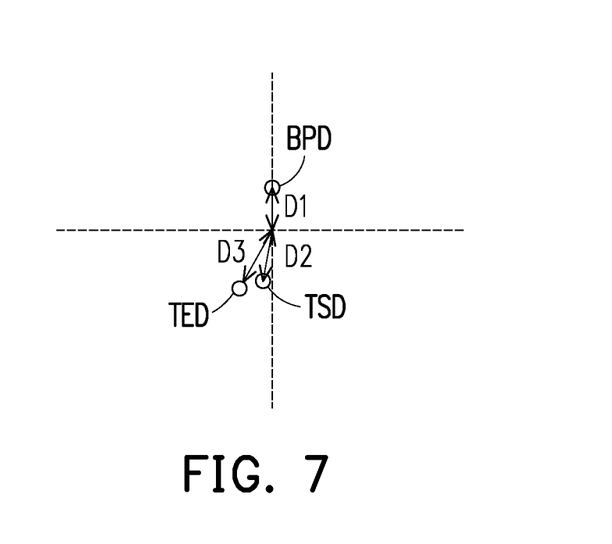
FIG. 7 is a partially enlarged view of FIG. 6.

In an embodiment, for the same evaluation value/grade, the processor 130 may further subdivide the evaluation value/grade of the types of defects. For example, FIG. 7 is a partially enlarged view of FIG. 6. With reference to FIG. 7, a distance D1 between the center-of-gravity position of basal plan dislocation BPD and the reference point is smaller than a distance D2 between the center-of-gravity position of threading screw dislocation TSD and the reference point, and the distance D2 is smaller than a distance D3 between the center-of-gravity position of threading edge dislocation TED and the reference point. Therefore, the processor 130 determines that basal plan dislocation BPD belongs to grade AAA, threading screw dislocation TSD belongs to grade AA, and threading edge dislocation TED belongs to grade A.

In an embodiment, the processor 130 may determine distances between boundaries of one or more classification ranges, such as the ranges R1 and R2, and the center of the wafer according to an estimated bow of the processed wafer. Taking FIG. 6 as an example, if the processor 130 reduces the radius of the range R1, it can be predicted that the bow of the wafer within the range R1 is relatively low. For another example, if a relatively high bow of the wafer is allowable, the processor 130 may expand the range R2.

In an embodiment, the processor 130 may determine a plurality of evaluation values/grades, for example, evaluation values 1 to 5, or grades A to C. In addition, the processor 130 may obtain a center-of-gravity position of defects of a plurality of defect types, and compare a first evaluation value/grade with a second evaluation value/grade among the evaluation values/grades to generate a comparison result. The first evaluation value/grade corresponds to a first center-of-gravity position formed by a defect of a first type among the defect types, and the second evaluation value/grade corresponds to a second center-of-gravity position formed by a defect of a second type among the defect types. For example, the comparison result shows that the first evaluation value is lower than the second evaluation value, where a higher evaluation value indicates higher uniformity, and a lower evaluation value indicates lower uniformity. For another example, the comparison result shows that the first grade is higher than the second grade, where a higher grade indicates higher uniformity, and a lower grade indicates lower uniformity. For another example, the comparison result shows that the grades/evaluation values are the same.

It should be noted that, in some embodiments, it is also possible that a higher evaluation value indicates lower uniformity, and a lower evaluation value indicates higher uniformity.

In an embodiment, the processor 130 may compare a distance between the first center-of-gravity position and the center of the wafer with a distance between the second center-of-gravity position and the center of the wafer to determine the comparison result between the two evaluation values/grades. For example, if the distance between the first center-of-gravity position and the center of the wafer is shorter than the distance between the second center-of-gravity position and the center of the wafer, the comparison result shows that the first grade is higher than the second grade, or the comparison result shows that the first evaluation value is higher than the second evaluation value.

The processor 130 may determine the (total/final) evaluation value/grade of the defects of these types (or the evaluation value/grade of the wafer) according to the comparison result between the first evaluation value/grade and the second evaluation value/grade. In an embodiment, if the comparison result shows that a plurality of evaluation values/grades are all the same, the processor 130 may determine that the evaluation value/grade of any defect type is the (total/final) evaluation value/grade of the defects of these defect types.

In an embodiment, if a lowest one among a plurality of evaluation values/grades is obtained from the comparison result, the processor 130 may determine a lowest evaluation value/grade among the first evaluation value/grade and the second evaluation value/grade to be the evaluation value/grade of the defects of these types. For example, if basal plan dislocation BPD belongs to grade A and threading screw dislocation TSD belongs to grade B, the wafer belongs to grade B.

It should be noted that two defect types are taken as examples in the above description, but people applying the same may accordingly make analogy to more defect types. In addition, in the embodiments above, uniformity is evaluated for the defect of the wafer as a whole, but uniformity may be evaluated by regions to improve the accuracy.

In an embodiment, the processor 130 may divide the wafer into a plurality of regions, and determine a center-of-gravity position of one or more defects in each of the regions. The regions do not overlap. A range between a boundary of one of the regions and the center of the wafer is different from a range between a boundary of another one of the regions and the center of the wafer. For example, the wafer has a radius of 65 millimeters (mm), a first region ranges from 0 mm to 35 mm from the center, a second region ranges from 35 mm to 50 mm from the center, and a third region ranges from 50 mm to 60 mm from the center.

Figure 8A:
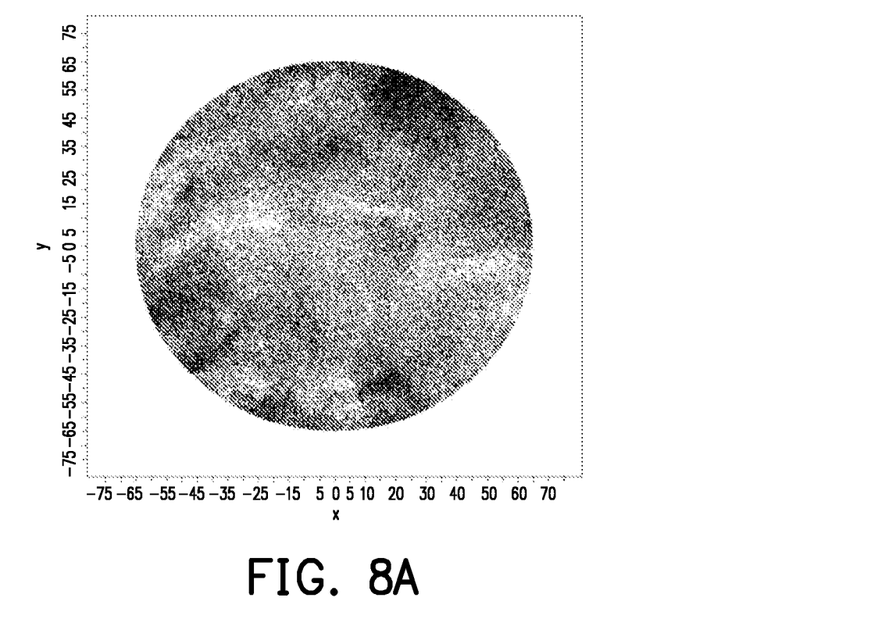
FIG. 8A is a schematic diagram exemplarily illustrating defect distribution within 0 millimeters (mm) to 65 mm of a wafer with a highest evaluation value/grade.
Figure 8B:
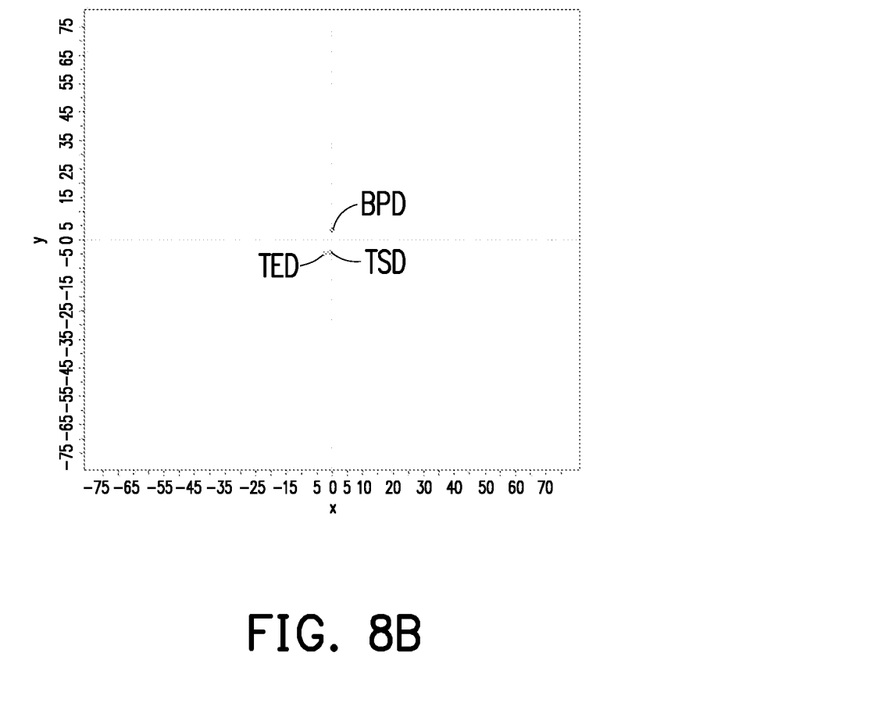
FIG. 8B is a schematic diagram of a center of gravity of FIG. 8A.
Figure 9A:
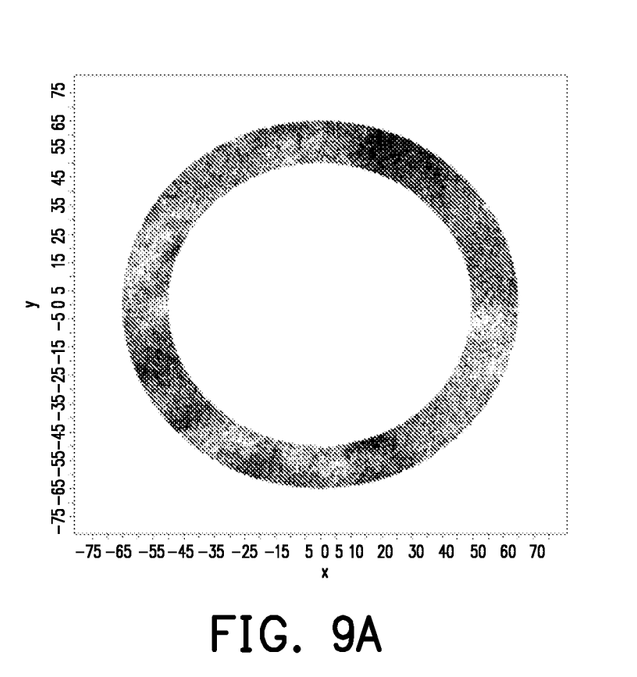
FIG. 9A is a schematic diagram exemplarily illustrating defect distribution within 50 mm to 65 mm of a wafer with a highest evaluation value/grade.
Figure 9B:
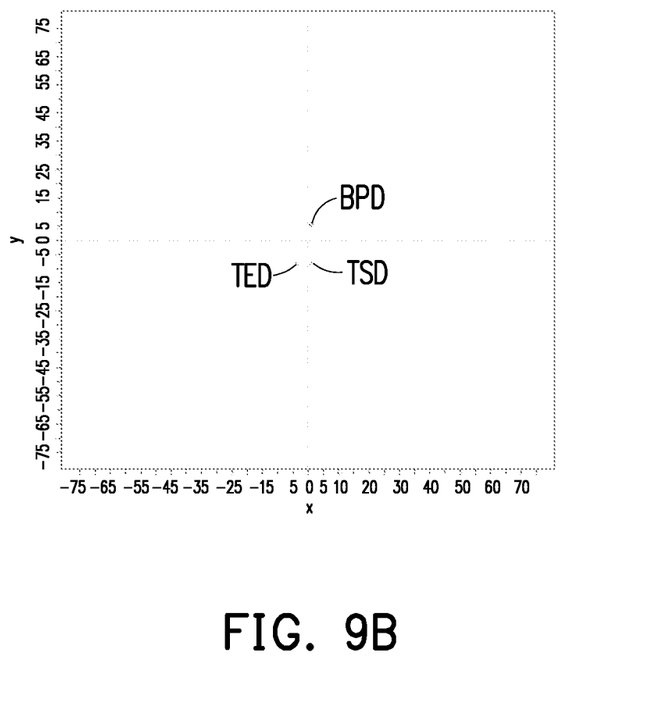
FIG. 9B is a schematic diagram of a center of gravity of FIG. 9A.
Figure 10A:
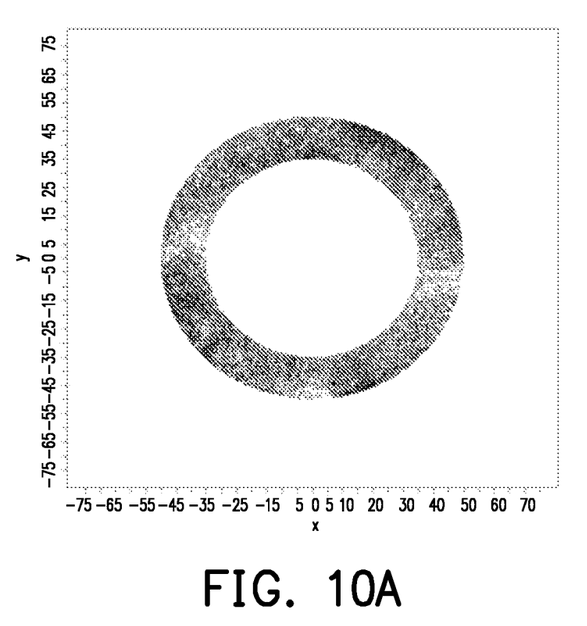
FIG. 10A is a schematic diagram exemplarily illustrating defect distribution within 35 mm to 50 mm of a wafer with a highest evaluation value/grade.
Figure 10B:
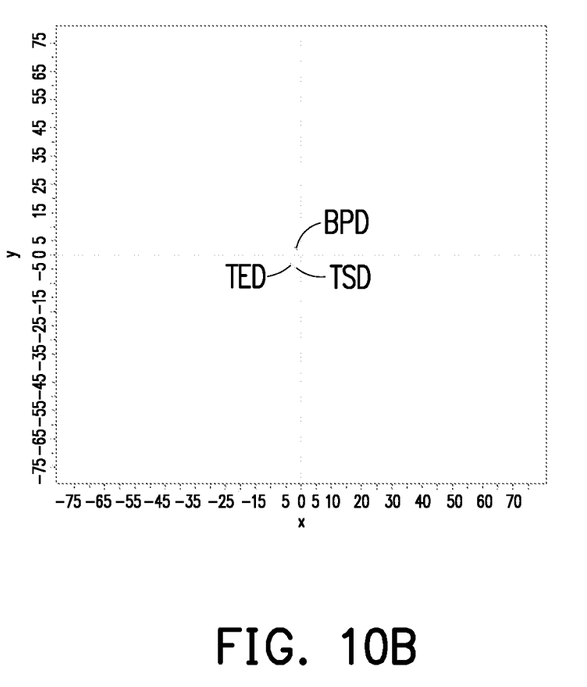
FIG. 10B is a schematic diagram of a center of gravity of FIG. 10A.
Figure 11A:
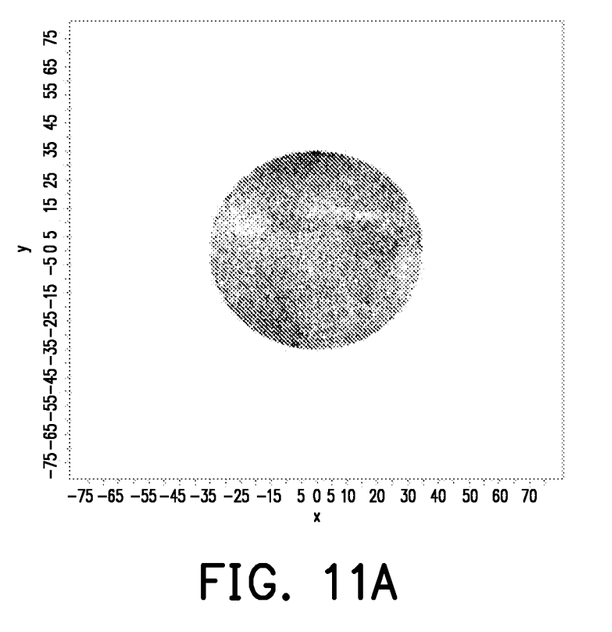
FIG. 11A is a schematic diagram exemplarily illustrating defect distribution within 0 mm to 35 mm of a wafer with a highest evaluation value/grade.
Figure 11B:
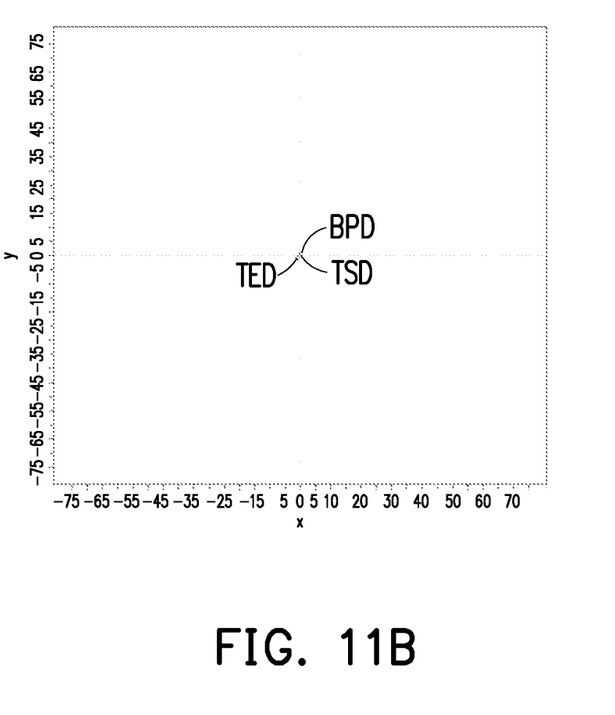
FIG. 11B is a schematic diagram of a center of gravity of FIG. 11A.

FIG. 8A is a schematic diagram exemplarily illustrating defect distribution within 0 mm to 65 mm of a wafer with a highest evaluation value/grade, and FIG. 8B is a schematic diagram of a center of gravity of FIG. 8A; FIG. 9A is a schematic diagram exemplarily illustrating defect distribution within 50 mm to 65 mm of a wafer with a highest evaluation value/grade, and FIG. 9B is a schematic diagram of a center of gravity of FIG. 9A; FIG. 10A is a schematic diagram exemplarily illustrating defect distribution within 35 mm to 50 mm of a wafer with a highest evaluation value/grade, and FIG. 10B is a schematic diagram of a center of gravity of FIG. 10A; FIG. 11A is a schematic diagram exemplarily illustrating defect distribution within 0 mm to 35 mm of a wafer with a highest evaluation value/grade, and FIG. 11B is a schematic diagram of a center of gravity of FIG. 11A. With reference to FIG. 8A to FIG. 11B, center-of-gravity positions in different regions may be different. For example, a distance between each center-of-gravity position and the center shown in FIG. 11B is shorter than a distance between each center-of-gravity position and the center shown in FIG. 9B.

Figure 12A:
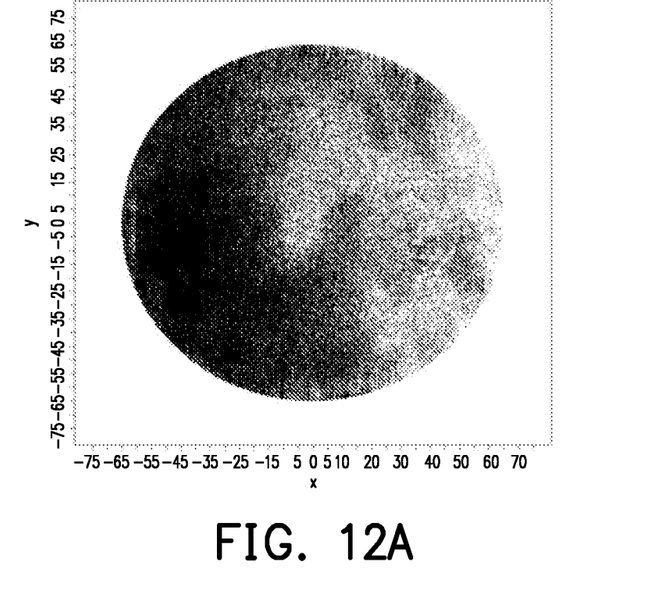
FIG. 12A is a schematic diagram exemplarily illustrating defect distribution within 0 mm to 65 mm of a wafer with a lowest evaluation value/grade.
Figure 12B:
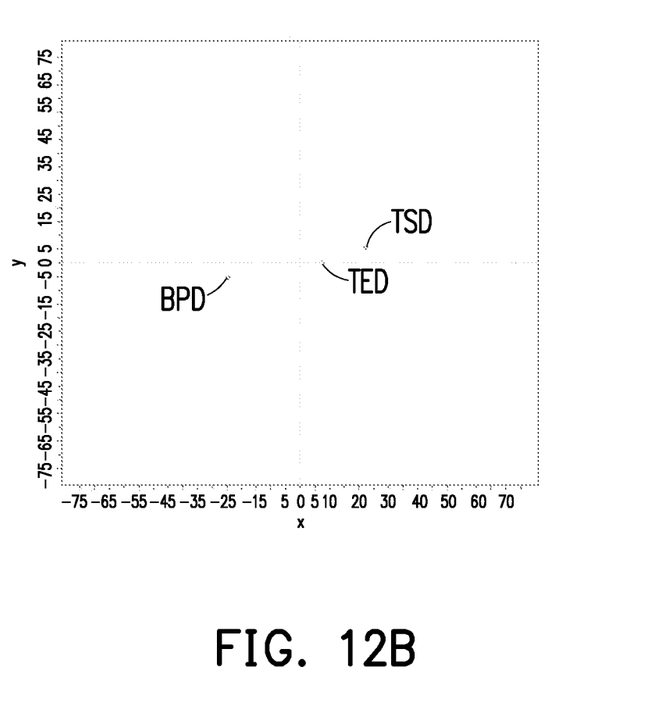
FIG. 12B is a schematic diagram of a center of gravity of FIG. 12A.
Figure 13A:
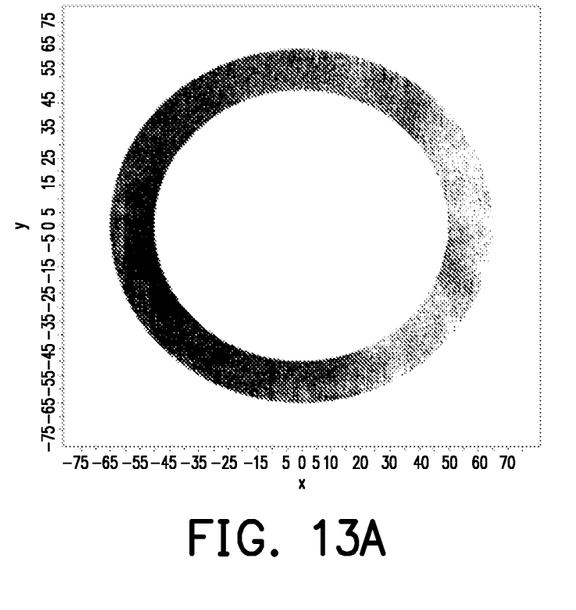
FIG. 13A is a schematic diagram exemplarily illustrating defect distribution within 50 mm to 65 mm of a wafer with a lowest evaluation value/grade.
Figure 13B:
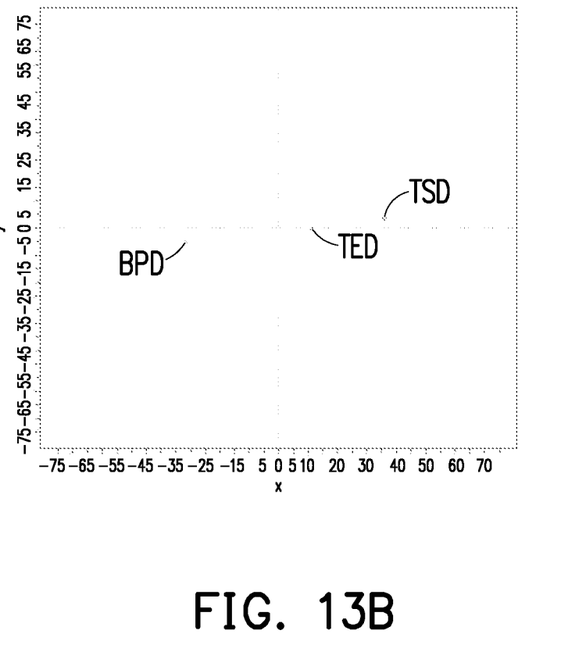
FIG. 13B is a schematic diagram of a center of gravity of FIG. 13A.
Figure 14A:
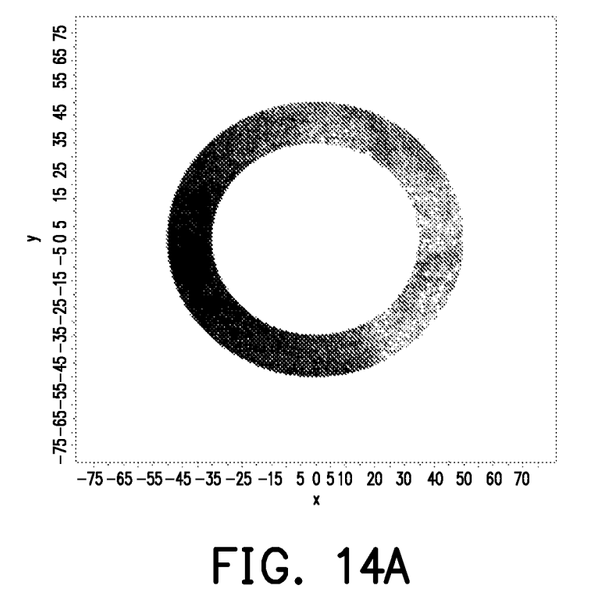
FIG. 14A is a schematic diagram exemplarily illustrating defect distribution within 35 mm to 50 mm of a wafer with a lowest evaluation value/grade.
Figure 14B:
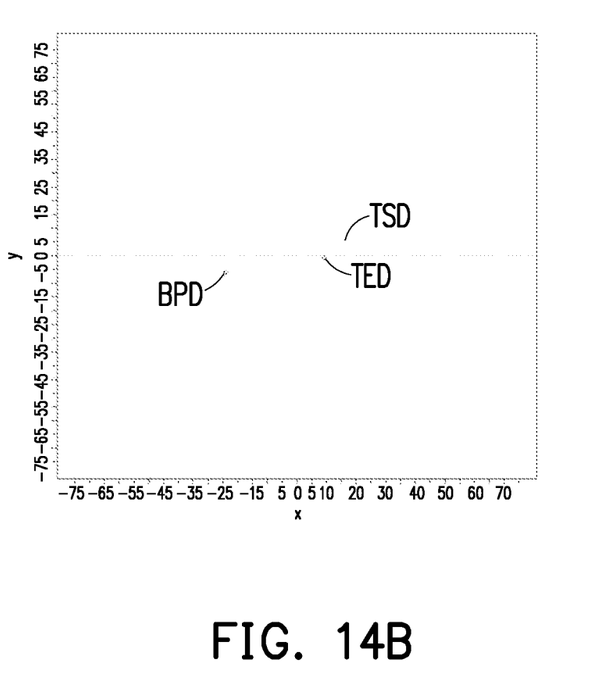
FIG. 14B is a schematic diagram of a center of gravity of FIG. 14A.
Figure 15A:
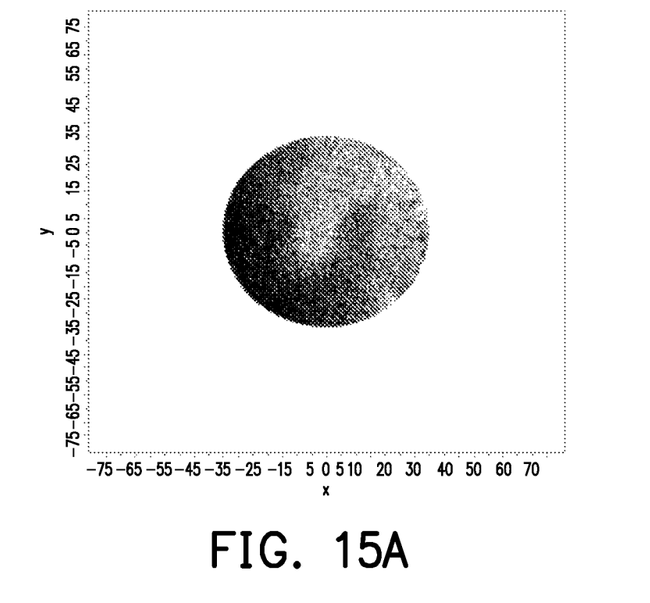
FIG. 15A is a schematic diagram exemplarily illustrating defect distribution within 0 mm to 35 mm of a wafer with a lowest evaluation value/grade.
Figure 15B:
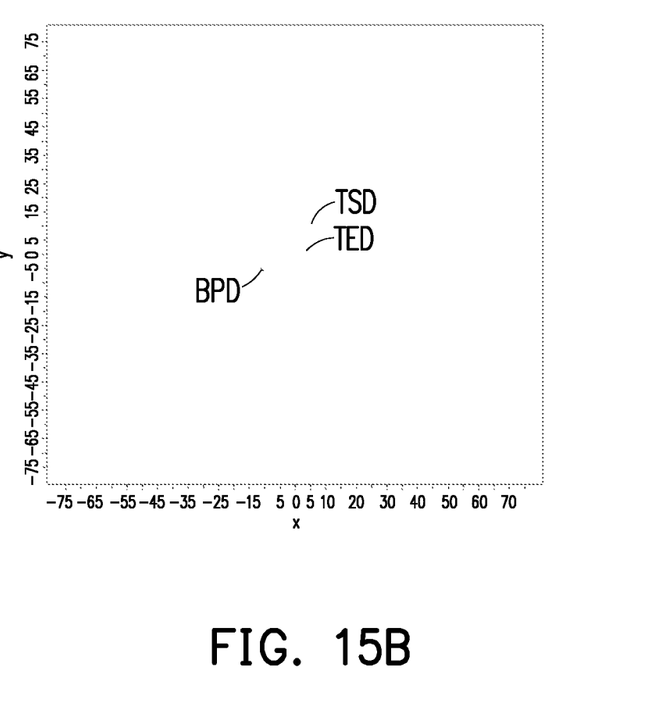
FIG. 15B is a schematic diagram of a center of gravity of FIG. 15A.

FIG. 12A is a schematic diagram exemplarily illustrating defect distribution within 0 mm to 65 mm of a wafer with a lowest evaluation value/grade, and FIG. 12B is a schematic diagram of a center of gravity of FIG. 12A; FIG. 13A is a schematic diagram exemplarily illustrating defect distribution within 50 mm to 65 mm of a wafer with a lowest evaluation value/grade, and FIG. 13B is a schematic diagram of a center of gravity of FIG. 13A; FIG. 14A is a schematic diagram exemplarily illustrating defect distribution within 35 mm to 50 mm of a wafer with a lowest evaluation value/grade, and FIG. 14B is a schematic diagram of a center of gravity of FIG. 14A; FIG. 15A is a schematic diagram exemplarily illustrating defect distribution within 0 mm to 35 mm of a wafer with a lowest evaluation value/grade, and FIG. 15B is a schematic diagram of a center of gravity of FIG. 15A. With reference to FIG. 12A to FIG. 15B, similarly, center-of-gravity positions in different regions may be different. For example, a distance between each center-of-gravity position and the center shown in FIG. 15B is shorter than a distance between each center-of-gravity position and the center shown in FIG. 13B.

In an embodiment, the processor 130 may compare with a third lowest evaluation value/grade of the regions with a fourth lowest evaluation value/grade of the defect types, and determine a lowest evaluation value/grade among the third lowest evaluation value/grade and the fourth lowest evaluation value/grade to be the (total/final) evaluation value/grade of the defects of the types (or to be the evaluation value/grade of the wafer). In other words, the processor 130 may take the lowest evaluation value/grade of all defect types in all regions to be the evaluation value/grade of the wafer.

For example, Table (1) is an example of uniformity evaluation:

TABLE 1

| Initial evaluation | Re-evaluation | Grade |
|---|---|---|
| A | A | A |
|   | B | B |
|   | C | C |
| B | A | B |
|   | B | B |
|   | C | C |
| C | A | C |
|   | B | C |
|   | C | C |

In Table (1), the initial evaluation is for defects of all defect types in the wafer as a whole, and the re-evaluation is for defects of all defect types in each region of the wafer. If the initial evaluation grade is grade A and the re-evaluation grade is grade C, the final grade is grade C, and so on and so forth (i.e., taking whichever being the lowest). It is worth noting that if the initial evaluation grade is already the lowest grade (e.g., grade C), the processor 130 may omit the re-evaluation and directly take the lowest grade as the final grade. Alternatively, if the initial evaluation grade is lower than the re-evaluation grade, the processor 130 may also take the initial evaluation grade as the final grade. By analogy, if the initial evaluation grade is higher than the re-evaluation grade, the processor 130 takes the re-evaluation grade as the final grade. It should be noted that the grade is taken as an example in this embodiment, but the evaluation value or other quantified values of uniformity may also be applicable, which will not be repeatedly described here.

In summary of the foregoing, in the ingot evaluation method and the detecting apparatus of the embodiments of the disclosure, the uniformity of defect distribution is determined according to the center-of-gravity position of the defect, and is further taken as a basis for evaluating quality of an ingot. Accordingly, the quality of an ingot can be judged early, which not only saves the cost, but also improves the quality, yield, and time in subsequent processing.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An ingot evaluation method adapted for evaluating a wafer, the ingot evaluation method comprising:
   obtaining defect information of a wafer from an ingot, wherein the defect information comprises a position of at least one defect identified by optical detection;
   determining a center-of-gravity position of the at least one defect according to the defect information; and
   evaluating uniformity of the at least one defect according to the center-of-gravity position, wherein the uniformity is related to quality of a processed wafer, an index of the uniformity comprises at least one evaluation value, and evaluating the uniformity of the at least one defect according to the center-of-gravity position comprises:
      determining a classification range where the center-of-gravity position is located, wherein each of the evaluation value corresponds to one of the classification range, and a center of the classification range is the same as a center of the wafer; and
      determining an evaluation value of the at least one defect according to the classification range.

2. The ingot evaluation method according to claim 1, further comprising:
   determining a distance between a boundary of the classification range and the center of the wafer according to an estimated bow of the processed wafer.

3. The ingot evaluation method according to claim 1, wherein the at least one evaluation value comprises a plurality of evaluation values, the at least one defect comprises defects of a plurality of defect types, the defect information further comprises the defect type of the at least one defect, and determining the evaluation value of the at least one defect according to the classification range comprises:
   comparing a first evaluation value and a second evaluation value among the evaluation values, wherein the first evaluation value corresponds to a first center-of-gravity position formed by a defect of a first type among the defect types, and the second evaluation value corresponds to a second center-of-gravity position formed by a defect of a second type among the defect types; and determining the evaluation value of the at least one defect according to a comparison result between the first evaluation value and the second evaluation value.

4. The ingot evaluation method according to claim 3, wherein determining the evaluation value of the at least one defect according to the comparison result between the first evaluation value and the second evaluation value comprises:
determining a lowest evaluation value among the first evaluation value and the second evaluation value to be the evaluation value of the at least one defect.

5. The ingot evaluation method according to claim 3, wherein comparing the first evaluation value and the second evaluation value among the evaluation values comprises:
comparing a distance between the first center-of-gravity position and the center of the wafer with a distance between the second center-of-gravity position and the center of the wafer.

6. The ingot evaluation method according to claim 3, wherein determining the center-of-gravity position of the at least one defect according to the defect information comprises:
dividing the wafer into a plurality of regions, wherein the regions do not overlap, and a range between a boundary of one of the regions and the center of the wafer is different from a range between a boundary of another one of the regions and the center of the wafer; and
determining the center-of-gravity position of the at least one defect in each of the regions.

7. The ingot evaluation method according to claim 6, wherein determining the evaluation value of the at least one defect according to the comparison result between the first evaluation value and the second evaluation value comprises:
comparing a first lowest evaluation value of the regions with a second lowest evaluation value of the defect types; and
determining a lowest evaluation value among the first lowest evaluation value and the second lowest evaluation value to be the evaluation value of the at least one defect.

8. A detecting apparatus comprising:
a memory configured to store a code; and
a processor coupled to the memory and configured to load and execute the code to:
obtain defect information of a wafer, wherein the defect information comprises a position of at least one defect identified by optical detection;
determine a center-of-gravity position of the at least one defect according to the defect information; and
evaluate uniformity of the at least one defect according to the center-of-gravity position, wherein the uniformity is related to quality of a processed wafer, and the processor is further configured to:
determine a classification range where the center-of-gravity position is located, wherein each of at least one grade corresponds to one of the classification range, and a center of the classification range is the same as a center of the wafer; and
determine a grade of the at least one defect according to the classification range.

9. The detecting apparatus according to claim 8, wherein the processor is further configured to:
determine a distance between a boundary of the classification range and the center of the wafer according to an estimated bow of the processed wafer.

10. The detecting apparatus according to claim 8, wherein the at least one grade comprises a plurality of grades, the at least one defect comprises defects of a plurality of defect types, the defect information further comprises the defect type of the at least one defect, and the processor is further configured to:
compare a first grade and a second grade among the grades, wherein the first grade corresponds to a first center-of-gravity position formed by a defect of a first type among the defect types, and the second grade corresponds to a second center-of-gravity position formed by a defect of a second type among the defect types; and
determine the grade of the at least one defect according to a comparison result between the first grade and the second grade.

11. The detecting apparatus according to claim 10, wherein the processor is further configured to:
determine a lowest grade among the first grade and the second grade to be the grade of the at least one defect.

12. The detecting apparatus according to claim 10, wherein the processor is further configured to:
compare a distance between the first center-of-gravity position and the center of the wafer with a distance between the second center-of-gravity position and the center of the wafer.

13. The detecting apparatus according to claim 10, wherein the processor is further configured to:
divide the wafer into a plurality of regions, wherein the regions do not overlap, and a range between a boundary of one of the regions and the center of the wafer is different from a range between a boundary of another one of the regions and the center of the wafer; and
determine the center-of-gravity position of the at least one defect in each of the regions.

* * * * *